Feb. 22, 1949.  J. K. HODNETTE  2,462,191
METHOD OF WINDING COILS
Filed Jan. 15, 1946  2 Sheets-Sheet 1
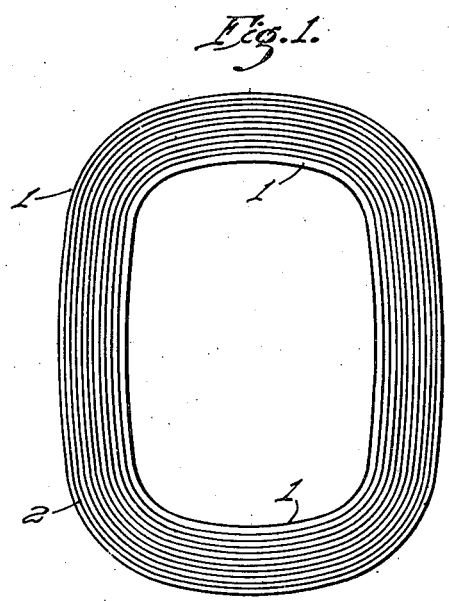
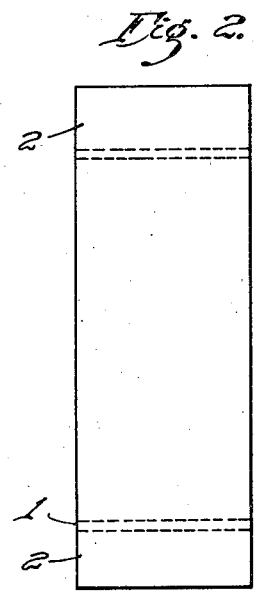
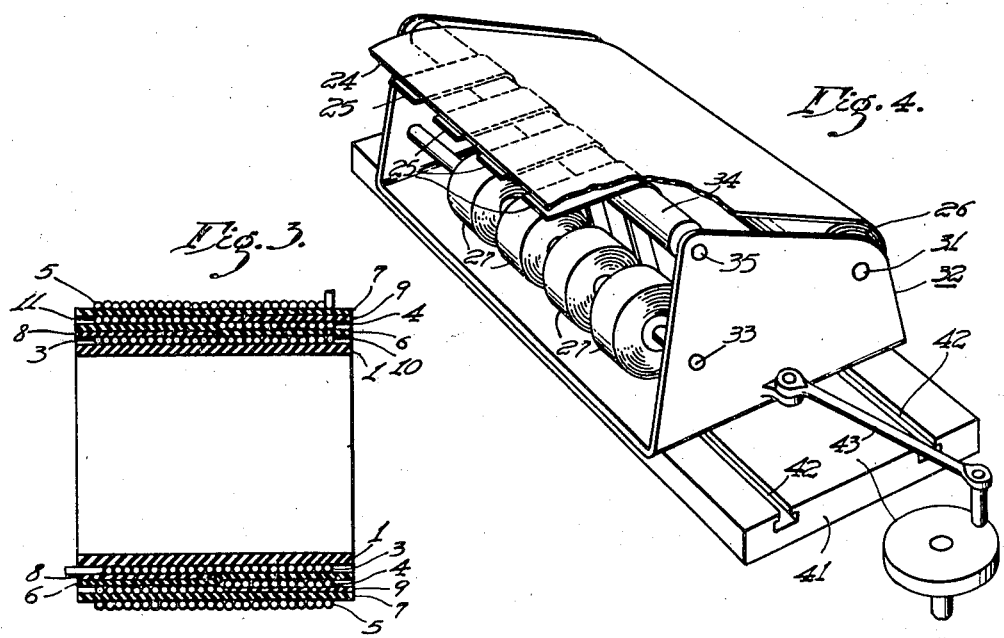
WITNESSES:
INVENTORS
John K. Hodnette and
Allan D. Forbes.
BY
Franklin E. Hardy
ATTORNEY Feb. 22, 1949. J. K. HODNETTE 2,462,191
METHOD OF WINDING COILS
Filed Jan. 15, 1946 2 Sheets-Sheet 2

WITNESSES:

INVENTORS
John K. Hodnette and
Allan D. Forbes.
BY
ATTORNEY

Patented Feb. 22, 1949

2,462,191

UNITED STATES PATENT OFFICE 2,462,191

METHOD OF WINDING COILS

John K. Hodnette and Allan D. Forbes, Sharon, Pa., assignors to Westinghouse Electric Corporation, East Pittsburgh, Pa., a corporation of Pennsylvania Application January 15, 1946, Serial No. 641,399

5 Claims. (Cl. 242—10)

This invention relates to electrical winding coils and particularly to a method of manufacturing such coils. Our invention has particular application to a method of winding coils in which graded layers of insulating material are provided between the several layers of conductor winding turns.

In said types of winding coils, such as are applicable for use in electrical transformers or similar electrical apparatus, it is desirable to provide a plurality of layers of sheets of insulating material between several layers of conductor turns, and to so arrange the several sheets of such material between two adjacent layers of conductor turns as to vary the thickness of the insulating material along the length of the coil from one end to the other so as to provide the greatest thickness of insulating material between the winding turns in the adjacent layers of turns that are at the ends of the adjacent layers having the greatest voltage stress between them. It is also desirable to arrange the winding turns of the conductor and the layers of insulating material so that the greatest thickness of insulating material between the turns in the adjacent layers of winding turns will be at opposite ends of the coil in the adjacent layers.

In order to decrease the cost of making coils, they are sometimes wound on machines which wind several coils simultaneously side by side on a single tube of insulating material. When the winding of the several coils on one insulating tube or "stick" is completed, the stick is then cut into parts corresponding to the several individual coils.

When such "automatic" winding machines are used to wind a number of coils simultaneously, the layer insulation is wound as a side sheet of material which is of sufficient width to extend across all the coils being simultaneously wound. It has not been possible under previously known practices to simultaneously wind a plurality of similar coils provided with graded insulation, including the features hereby disclosed.

It is an object of our invention to provide a method of simultaneously winding a plurality of winding coils of insulated circuit conductor in a plurality of successive layers of winding turns and to simultaneously wind into the several winding coils layers of insulating material to provide graded thicknesses of insulating material between the successive layers of winding turns.

It is also an object of the invention to so wind the turns of the winding coil and to provide successive layers of turns extending in sequence in opposite directions along the coil, and to so position the graded layers of insulating material as to position the greatest thickness of insulating material between one pair of adjacent layers of winding turns on the opposite end of the coil from the greatest thickness of insulating material in the next adjacent spaces between successive layers of winding turns so as to form a compact coil structure.

Other objects and advantages of the invention will be apparent from the following description of a preferred embodiment of the invention, reference being had to the accompanying drawings, in which:

Fig. 1 is a plan view of a winding coil constructed in accordance with the invention;

Fig. 2 is a side view of the winding coil shown in Fig. 1;

Fig. 3 is a cross-sectional view of a portion of a winding coil constructed in accordance with the invention, three layers only of the circuit conductor turns being shown;

Fig. 4 is a perspective view of the arrangement of the reels supplying the insulating material and the supporting structure for the reels;

Figure 5:
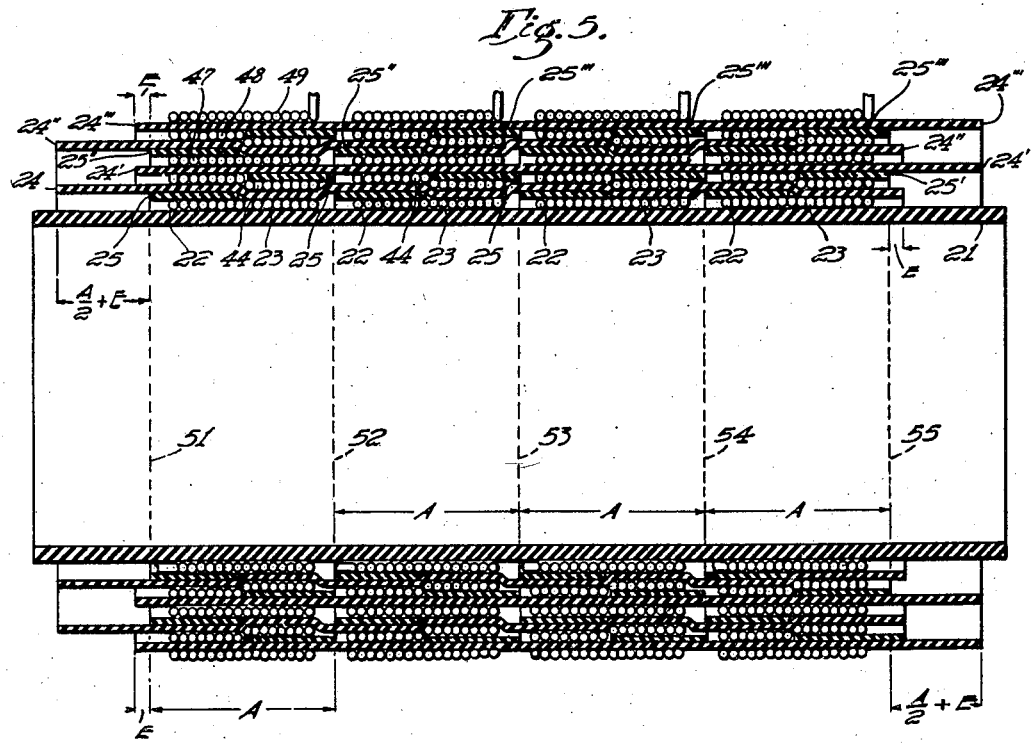
Fig. 5 is a cross-sectional view of a plurality of winding coils wound on a single tube of insulating material before being cut into individual coils.

Referring to the drawings, and particularly to Figs. 1, 2 and 3, a tube 1 and layers of winding turns 2 are provided. As illustrated in Fig. 3, three layers 3, 4 and 5 of winding turns are shown, it being understood that any desired number of layers may be employed. Layers of insulating material 6 and 7 are shown extending the entire length of the coil and beyond the ends of the winding turns at each end of the group of turns comprising the coil layers. Also, narrow layers of insulating material 8 and 9 are provided, extending approximately from the center of the coil to the outer edge thereof between the layers of winding turns, the narrow layers extending in opposite directions from the center of the coil in adjacent layers, that is, in the area in which the voltage gradient between adjacent turns in the adjacent layers is the greatest. For example, the layer of winding turns 3, comprising the first layer, starts at the left as shown in Fig. 3, and extends in a succession of winding turns toward the right about the tube 1, the successive turns in the next layer 4 being positioned about the layer 3, and extending from the right to the left so that the greatest voltage stress between these two layers is at the left of the center of the coil. The narrow strip of insulating material 8 is therefore positioned from the center of the coil to the left of the center of the coil, between these two winding layers, so that, the layer 8 is positioned to the left of the center of the coil and provides insulation in addition to the layer 6, which extends for the whole length of the coil. The layers of turns in the winding layer 5 extend from the left to the right so that increased stress in the voltage between the turns in the layers 4 and 5 is at the right of the center of the coil. In this area, a narrow strip of insulating material 9 extends from the center of the coil to the extreme right, together with the strip 7 of insulating material which extends for the full length of the coil. This arrangement of the several layers of winding turns continues layer upon layer throughout the coil for as many layers of winding turns as is necessary to complete the coil.

This arrangement of the layers of insulating material reduces the insulation near the crossover between adjacent layers to one thickness of material as compared to two thicknesses of the insulating material positioned between the turns at the opposite ends of these layers. For example, the crossover between the first layer 3 of conductor winding turns and the second layer of turns 4 is at 10, and the crossover between the second layer of turns 4 and the third layer of turns 5 is at 11. In the space between the second and third layers of winding turns the double insulation and single insulation are reversed in position with respect to the positions of the corresponding layers of insulation between the first and second layers of winding turns so that the double insulation is on the other side of the center of the coil. This arrangement continues throughout the successive spaces between adjacent layers of winding turns since the crossovers between the successive layers of turns alternate from the right to the left ends of the layers as viewed in the drawings. The total thickness of insulation at any one end of the coil for all layers is the same as at the other end if an even number of layers is used, and approximately the same when an odd number of layers is used. The coil thus builds up evenly on the two ends as the coil is wound, providing double the amount of insulation at the high voltage ends of successive layers than is employed at the low voltage ends, thus being economical of material and space required.

Referring to Fig. 5, tube 21 of insulating material, such as pressboard, is employed as a form about which are wound a plurality of winding coils, four such coils being shown in Fig. 5. In winding the several coils, a separate strand of insulated copper wire may be used for each of the several coils, and similarly fed to be wound about the tube 21 in successive turns, the corresponding turns being spaced along the tube 21, an amount corresponding to the length of the finished coils. For example, the first turn in the first layer of each coil is shown at 22, there being four such first turns corresponding to the four coils to be wound. The successive turns in the first layer of winding turns 23 extend from the left to the right until the number of winding turns desired in the first layer of the several coils is completed. At this point in the winding operation the layers of insulating material comprising a wide sheet 24 and a plurality of narrow sheets 25 of insulating material are wound about the first layers of winding turns 23 of the several coils. As shown in Fig. 4, these sheets of insulating material may be fed from suitable reels, the reel 26 supplying the wide sheet 24 that extends over the entire length of the several coils with a margin at the ends as will be later explained. A number of reels 27 corresponding to the number of coils being wound are likewise provided for supplying the narrow strips 25, there being four in number in the illustrated embodiment. The reel 26 is mounted on a shaft 31, the opposite ends of which are positioned in a frame 32 carrying also a shaft 33 upon which are mounted the several reels 27. As illustrated, the sheets of insulating material 25 from the reels 27 extend upwardly over a roller 34 mounted on a shaft 35, having its opposite ends also positioned in the frame 32 and over which the sheet 24 from the reel 26 also passes.

Figure 6:
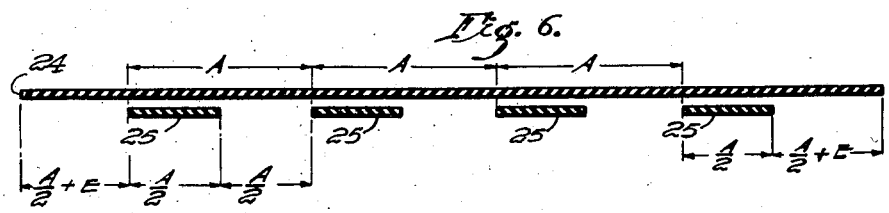
Fig. 6 is a cross-sectional view of the several sheets of insulating material as fed to the winding coils during the winding operation.

If the length of the finished coil is given the dimension A, then the width of the strips of insulation 25 will be A/2 and the space between the edges of adjacent strips 25 as they are fed onto the layers of winding turns as shown in Figs. 5 and 6 will also be A/2. That is to say, the several reels 27 are so spaced along the shaft 33 that the strips fed therefrom are spaced in accordance with the width of the finished coils being wound, and the strip of material fed from these reels 27 is a width corresponding to one-half of the length of the coil. The sheet 24 will have a width somewhat greater than the width of the four coils being wound, so that there will be a margin of E at one end of the layer beyond the outer edge of the series of coils, and a margin of A/2 plus E at the opposite end of the group of coils. In alternate layers of insulation between the layers of winding turns, these margins are reversed in position to the opposite ends of the group of winding turns as shown in Fig. 5.

The frame 32 carrying the several reels 26 and 27 is mounted upon a base structure 41 so as to be slidable in grooves 42 in a direction parallel to the axis of the tube 21 upon which the coils are being wound. Any suitable mechanism 43 may be provided and operated by any suitable means, such for positioning the frame 32 in the desired position for feeding the insulating material to the coils being wound. As shown in Fig. 5, the first application of the insulating material in sheets 24 and 25 are applied about the first layers 23 of winding turns is such that the narrow layers 25 extend from the center of the several coils toward the left margin of the narrow strip 25 coinciding with the edges of the individual coils. The sheet 24 extends across all of the several groups of layers 23, there being a slight margin E at the right beyond the outer edge of the right hand coil and a margin of A/2 plus E to the left of the outer edge of the left one of the four coils. After the layers of insulating material 24 and 25 are applied about the first layer of winding turns 23, the second layer of turns 44 is wound from the right to the left as viewed in Fig. 5, a similar layer being wound for each of the four coils. Upon the completion of the winding of the second layer of turns 44, sheets of insulating material 24' and 25', similar to the sheets 24 and 25, are applied about the second layer of winding turns. In order to position the narrow sheet 25' to the right of the center of the several groups of winding turns, the rack or frame 32 is moved along the supporting base 41 a distance corresponding to A/2, or one-half the length of the individual coils. By this operation, the narrow sheets 25 and the wide sheet 24 (as these sheets are identified in Figs. 4 and 6) have the same relative positions with respect to each other, but are moved along the axis of the tube 21 so that the narrow sheets, identified as 25' in the second layer, are to the right of the center of the several coils instead of to the left. It will be noted also that the wide margin of the sheet 24', A/2 plus E, is now to the right of the several coils, while the narrow margin E is to the left.

This procedure is continued. Successive layers of winding turns 47, 48 and 49 are shown, there being positioned between each pair of such layers sheets of insulating material similar to the sheets 24 and 25, indicated as 24' and 25', 24'' and 25'', etc. in the successive layers, these sheets being applied about each odd numbered layer of winding turns, such as 3, 5, etc., in the same manner as described for the first layer 24 and 25, and about each even numbered layer of winding turns in the same manner as described for the second layer 24' and 25'. This is accomplished as above described by moving the frame 32 carrying the reels 26 and 27 supplying the sheets of insulating material so that for each alternate layer of winding turns the sheets are applied to the right or to the left, an amount varying by one-half the width of the coils, that is, by the dimension A/2. By moving the paper feeding mechanism carried on the frame 32 horizontally to the left and then to the right, an amount corresponding to A/2 for each successive application of the layers of insulating material about the coils being wound, these layers will assume the positions shown in Fig. 5. In the coils shown in Fig. 5 the crossover between the conductor winding turns in the first and second layer is at the right of the coil and the crossover from the second to the third layer is at the left, the successive crossover alternating from one end of the group of layers to the other with each succeeding layer of winding turns.

For the purpose of better illustrating the invention, a few layers of winding turns only are shown, the dimensions of the conductors and layers of insulation being such as to clearly illustrate the arrangement of the parts in the winding structure. It will be appreciated, however, that coils having a considerable number of turns and with relatively thin sheets of insulating material are readily made in the manner described.

After the several winding coils are wound in the manner described, they are cut along the lines 51, 52, 53, 54, 55, thus separating the sheets of insulating material including the tube 21 and the flexible layers of insulating material wound about the several layers of winding turns of the coils, thus forming the several individual coils.

The number of thicknesses of insulating paper, or other flexible insulating material, can be varied as desired but the same principle, that of shifting the paper feeding mechanism parallel to the axis of the coils being wound will be maintained throughout.

Modifications in the illustrated method of forming winding coils will occur to one skilled in the art and we would not wish to be limited otherwise than by the scope of the appended claims.

We claim as our invention:

1. The method of simultaneously winding a plurality of winding coils comprising rotating a hollow tube of insulating material forming the support for the winding conductors, feeding a plurality of strands of insulated conductor onto the tube at spaced intervals along the tube to provide several groups of conductor winding turns corresponding to the several coils and providing a layer of conductor turns for each group, the sequence of winding turns providing a layer for each group extending in the same direction along the insulating tube, in applying at least one layer of a sheet of flexible insulating material extending across the several groups of conductor winding turns about the layer of winding turns by feeding a wide sheet of insulating material having a width greater than the width of the several coils together with a plurality of strips of insulating material corresponding to the number of coils being wound, each strip having a width less than the width of the coil when finished, the several strips being spaced in the direction of the axis of the coils distances corresponding to the lengths of the finished coils, the wide sheet together with the plurality of narrow sheets being so applied about the groups of winding turns that the major portion of the narrow strips are positioned to the side of the center of the group of winding turns on which the first wound turns of the layer of winding turns were wound, in winding a second layer of conductor winding turns for each group about said insulating material, the turns in the second layer being applied in sequence in the opposite direction from the sequence of winding turns in the first layer, in applying at least one layer of sheet of flexible insulating material extending across the several groups of conductor turns about the second layer of winding turns by feeding a wide sheet of insulating material having a width greater than the width of the several coils together with a plurality of strips of insulating material corresponding to the number of coils being wound, each strip having a width less than the width of the coil when finished, the several strips being spaced in the direction of the axis of the coils distances corresponding to the lengths of the finished coils, the wide sheet together with the plurality of narrow sheets being so applied about the groups of winding turns that the major portion of the narrow strips are positioned to the side of the center of the group of winding turns on which the first wound turns of the layer of winding turns were wound, and in continuing winding successive layers of winding turns, layer upon layer, in each group of winding turns with the sequence of the successive turns in each layer proceeding in the opposite direction along the length of the group of turns from the sequence of turns in the next previous layer until the desired number of layers of turns is completed, and in applying at least one layer of a sheet of insulating material across the several groups of conductor turns about each layer of conductor turns in the several groups of layers of turns, and in thereafter cutting the tube of insulating material and the layers of flexible insulating material to separate the several groups of turns into separate coils.

2. The method of simultaneously winding a plurality of winding coils comprising rotating a hollow tube of insulating material forming the support for the winding conductors, feeding a plurality of strands of insulated conductor onto the tube at spaced intervals along the tube to provide several groups of conductor winding turns corresponding to the several coils and providing a layer of conductor turns for each group, the sequence of winding turns for each group extending in the same direction along the insulating tube, in applying layers of sheet insulating material about the first layer of winding turns by feeding a wide sheet of insulating material having a width greater than the width of the several coils together with a plurality of strips of insulating material corresponding to the number of coils being wound, each strip having a width corresponding to one-half the width of the coil when finished, the several strips being spaced in the direction of the axis of the coils distances corresponding to the lengths of the finished coils, the wide sheet together with the plurality of narrow sheets being so applied about the groups of winding turns that the narrow strips extend from the center of the group to one side of the center corresponding to the side of the center on which the first wound turns of the layer of winding turns about which the insulating material is applied were wound, in winding a second layer of conductor winding turns about said insulating material, the turns in the second layer being applied in sequence in the opposite direction along the layer of turns than in the sequence of winding turns in the first layer, in applying layers of sheet insulating material about the second layer of winding turns by feeding a wide sheet of insulating material having a width greater than the width of the several coils together with a plurality of strips of insulating material corresponding to the number of coils being wound, each strip having a width corresponding to one-half the width of the coil when finished, the several strips being spaced in the direction of the axis of the coils distances corresponding to the lengths of the finished coils, the wide sheet together with the plurality of narrow sheets being so applied about the groups of winding turns that the narrow strips extend from the center of the group to one side of the center corresponding to the side of the center on which the first wound turns of the layer of winding turns about which the insulating material is applied were wound, and in continuing winding successive layers of winding turns, layer upon layer, in each group of winding turns with the sequence of the successive turns in each layer proceeding in the opposite direction along the length of the group of turns from the sequence of turns in the next previous layer until the desired number of layers of turns is completed and in similarly applying successive layers of sheet insulating material about each successive layer of winding turns, and in thereafter cutting the tube of insulating material and the layers of flexible insulating material to separate the several groups of turns into separate coils.

3. The method of simultaneously making a plurality of electrical winding coils comprising a plurality of conductor turns connected in series and arranged layer upon layer, and having layers of sheets of insulating material between the several layers of winding turns graded to provide the greatest thickness of insulating material between the ends of the adjacent layers of the winding turns having the greatest voltage stress between them, the method comprising simultaneously winding a plurality of conductor strands at spaced intervals about a tube of insulating material forming the inner surface of the several winding coils by rotating the tube and applying the several conductor strands in like layers of turns, the winding turns in each layer proceeding along the direction of the coil in sequence oppositely to the direction of the turns in the adjacent layer of conductor turns, and in applying layers of sheet insulating material about each layer of winding turns by feeding sheets of insulating material similarly positioned with respect to each other and winding about the layer, the sheets of material including a wide sheet of insulating material having a width greater than the total width of the several coils being simultaneously wound together with a plurality of narrow sheets of insulating material corresponding to the number of coils being wound, each narrow sheet having a width corresponding to one-half the width of the coil, and being spaced apart distances corresponding to the length of the coils, and in similarly moving the several sheets of insulating material in a direction parallel to the direction of the axis of the coils between the application of the insulating material about each layer of winding turns a distance equal to one-half the length of the coils, the successive movements of the several sheets in a direction parallel to the axis of the coils being in opposite directions between successive layers so the narrow sheets of insulating material when applied about the several groups of winding turns extend from the center of the layers of winding turns to one side thereof in opposite directions from the center in successive spaces between successive layers of winding turns corresponding to the side of the center of the layer on which the first wound turns of the layer of winding turns about which the insulating material is applied were wound.

4. The method of simultaneously winding a plurality of winding coils comprising rotating a hollow tube of insulating material forming the support for the winding conductors, feeding a plurality of strands of insulated conductor onto the tube at spaced intervals along the tube to provide several groups of conductor winding turns corresponding to the several coils and providing a layer of conductor turns for each group, the sequence of simultaneously winding the first layer of winding turns for each group with the successive winding turns in each group extending in the same direction along the insulating tube, in simultaneously applying at least one layer of a sheet of flexible insulating material having a width extending across the several groups of conductor winding turns about the layer of winding turns and a plurality of sheets of flexible insulating material having widths corresponding to half the width of the winding coil and applied to surround the first half only of the conductor turns of the layer in each group, in winding a second layer of conductor winding turns for each group about said insulating material, the turns in the second layer being applied in sequence in the opposite direction from the sequence of winding turns in the first layer, in simultaneously applying at least one layer of sheet of flexible insulating material having a width extending across the several groups of conductor turns about the second layer of winding turns and a plurality of sheets of flexible insulating material having widths corresponding to half the width of the winding coil and applied to surround the first half only of the second layer of conductor turns in each group, and in continuing winding successive layers of conductor winding turns, layer upon layer, in each group of winding turns with the sequence of the turns in each successive layer proceeding in the opposite direction along the length of the group of turns from the sequence of turns in the next previous layer until the desired number of layers of turns is completed, and in applying relatively wide and narrow sheets of insulating material about each layer of conductor turns in the several groups of layers of turns in a manner similar to the application of such insulating material about the first and second layers of winding turns, and in thereafter cutting the tube of insulating material and the layers of flexible insulating material to separate the several groups of turns into separate coils.

5. The method of simultaneously making a plurality of electrical winding coils comprising a plurality of conductor turns connected in series and arranged in layers of turns positioned layer upon layer, and having layers of sheets of insulating material between the several layers of winding turns graded to provide the greatest thickness of insulating material between the ends of the adjacent layers of the winding turns having the greatest voltage stress between them, the method comprising simultaneously winding a plurality of conductor strands at spaced intervals about a tube of insulating material forming the inner surface of the several winding coils by rotating the tube and applying the several conductor strands in like layers of turns, the winding turns in each layer proceeding along the direction of the coil in sequence oppositely to the direction of the turns in the adjacent layer of conductor turns, and in applying layers of sheet insulating material about each layer of winding turns by feeding sheets of insulating material similarly positioned with respect to each other and winding about the layer, the sheets of material including a wide sheet of insulating material having a width greater than the total width of the several coils being simultaneously wound together with a plurality of narrow sheets of insulating material corresponding to the number of coils being wound, and in similarly moving the several sheets of insulating material in a direction parallel to the direction of the axis of the coils between the application of the insulating material about each layer of winding turns, so that the narrow sheets of insulating material when applied about the several groups of winding turns are positioned adjacent the end of the layers of winding turns including the first wound turns in the layer of winding turns nearest the insulating material and about which the insulating material is wound.

JOHN K. HODNETTE.
ALLAN D. FORBES.

REFERENCES CITED

The following references are of record in the file of this patent:

UNITED STATES PATENTS

| Number | Name | Date |
| --- | --- | --- |
| 1,833,221 | Leidy | Nov. 24, 1931 |
| 2,218,118 | Martindell | Oct. 15, 1940 |